F. D. TELLIN.
CULTIVATING IMPLEMENT.
APPLICATION FILED OCT. 24, 1918.
1,309,228.
Patented July 8, 1919.
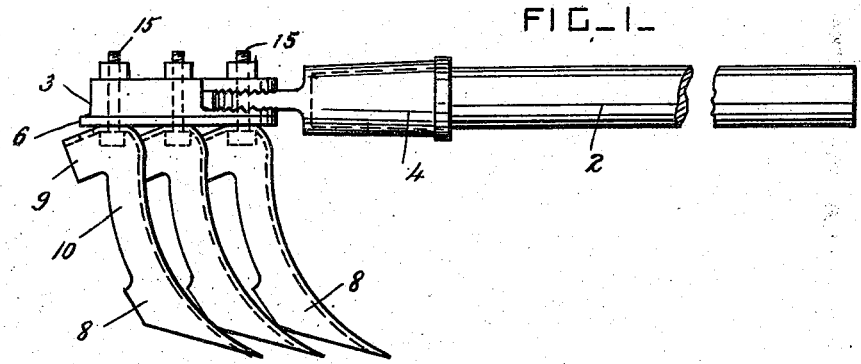
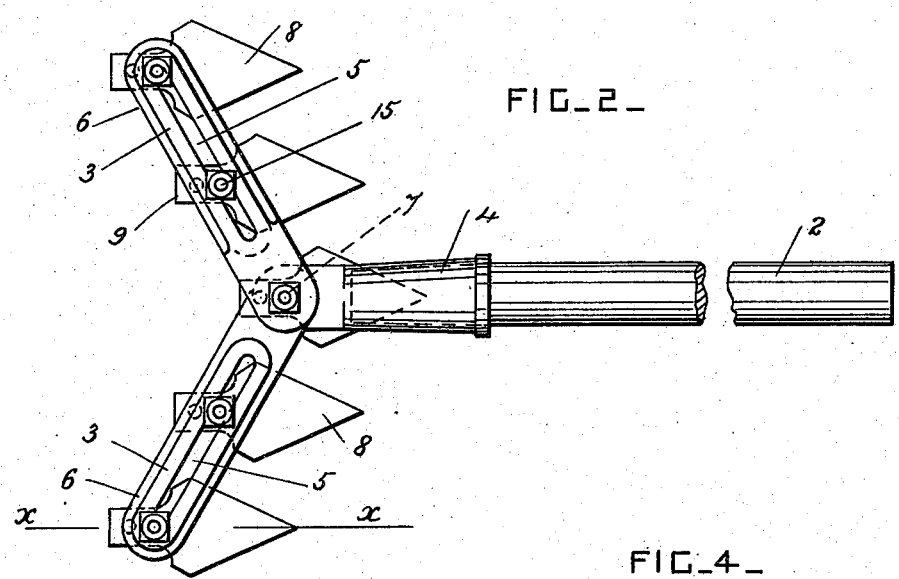
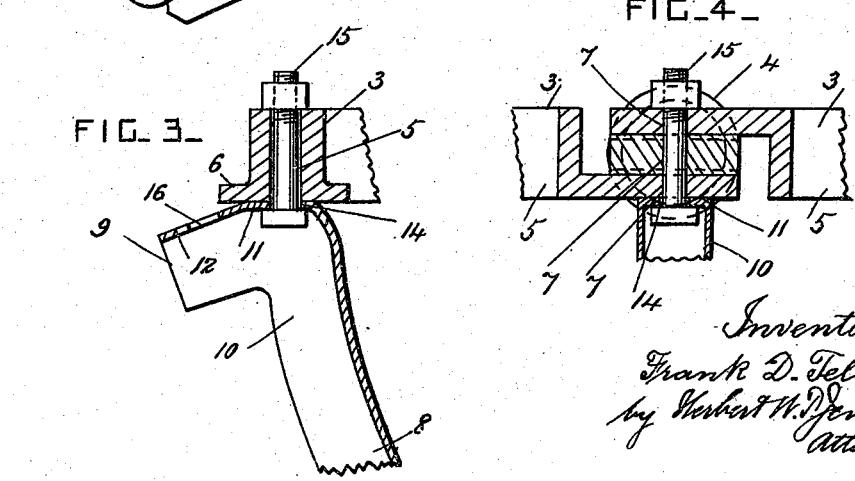

UNITED STATES PATENT OFFICE.

FRANK DANIEL TELLIN, OF KALONA, IOWA.

CULTIVATING IMPLEMENT.

1,309,228.  Specification of Letters Patent.  Patented July 8, 1919.

Application filed October 24, 1918. Serial No. 259,502.

*To all whom it may concern:*

Be it known that I, FRANK D. TELLIN, a citizen of the United States, residing at Kalona, Iowa, have invented certain new and useful Improvements in Cultivating Implements, of which the following is a specification.

This invention relates to hand cultivators for garden use sometimes called compound hoes; and it consists in the novel construction and combination of the parts hereinafter fully described and claimed.

In the drawings, Figure 1 is a side view of a cultivating implement constructed according to this invention. Fig. 2 is a plan view of the implement. Fig. 3 is a cross-section through the upper part of the shank of one blade and the slotted arm, taken on the line $x$—$x$ in Fig. 2. Fig. 4 is a detail view of the pivot.

The implement is provided with a handle 2 like that of an ordinary hoe or rake, and its head is formed of two arms 3 which are secured together and to the handle socket 4 or any other approved connecting device. These two arms are inclined at an angle to each other, and they have longitudinal slots 5 in them, and they also preferably have laterally projecting flanges 6 which stiffen them and enable them to be light in weight. The metal at the end of the socket between the two arms is provided with a bolt hole 7. The arms have also bolt holes 7.

Suitable cultivating blades 8 are provided, and five blades are shown, but more or less than five blades can be used. These blades are all alike, and for lightness and strength they are preferably formed of thin sheet metal, and are channel-shaped in cross-section. The upper end portion 9 of the shank 10 of each blade is arranged at an angle to the shank and it has two flat surfaces 11 and 12 arranged at a slight angle to each other and provided with bolt holes 14 and 16 respectively.

Fastening bolts 15 are provided for clamping the blades to the arms after their positions have been adjusted. These bolts engage with the bolt holes 7 and slots 5 and also with the bolt holes 14 and 16, and the bolts can be slid in the slots to any desired positions.

The surfaces 11 and 12 bear against the undersides of the arms 3 of the head, and the angular arrangement of the blades with respect to the handle is varied according to which bearing surface is placed against the arm, so as to make the implement suitable for deep cultivation or for shallow cultivation.

The blades can also be moved pivotally in either direction from their middle position, as shown in the drawings, before clamping them to the arms, so as to move the dirt to one side or the other as desirable.

The arms 3 can be adjusted pivotally to any angle by unclamping them from the bolt which passes through the three bolt holes 7, and which clamps them together and to the socket 4. The faces of the surfaces in contact around the bolt holes 7 are preferably grooved or roughened to prevent them from slipping when the parts are clamped together.

What I claim is:

1. A cultivating implement, having a supporting head, cultivating blades having shanks which are channel-shaped in cross-section and which have at their upper ends bearing surfaces arranged at an angle to each other and each provided with a bolt hole, and bolts which engage with the bolt holes of the shanks and clamp them to the head and permit the cultivating blades to be set at different angles with the head.

2. A cultivating implement, having a supporting head, cultivating blades having at the upper end portions of their shanks bearing surfaces arranged at an angle to each other and each provided with a bolt hole, and bolts for engaging with the bolt holes of the shanks and clamping them to the head in different positions.

3. A cultivating implement, having a head formed of two arms provided with longitudinal slots, cultivating blades having upper end portions arranged at an angle to their shanks and provided with a plurality of bearing surfaces and a plurality of bolt holes, and clamping bolts engaging with the said slots and bolt holes and permitting the positions of the blades to be varied.

In testimony whereof I have affixed my signature.

FRANK DANIEL TELLIN.

Copies of this patent may be obtained for five cents each, by addressing the "Commissioner of Patents, Washington, D. C."